(12) United States Patent
Hur et al.

(10) Patent No.: US 9,284,450 B2
(45) Date of Patent: Mar. 15, 2016

(54) POLYCARBONATE RESIN COMPOSITION AND MOLDED ARTICLE PRODUCED THEREFROM

(71) Applicant: Cheil Industries Inc., Gumi-si (KR)

(72) Inventors: Jong Chan Hur, Uiwang-si (KR); Jun Ho Chi, Uiwang-si (KR); Dong Geun Lee, Uiwang-si (KR); Woo Suk Chei, Uiwang-si (KR)

(73) Assignee: Cheil Industries Inc., Gumi-si (KR)

(*) Notice: Subject to any disclaimer, the term of this patent is extended or adjusted under 35 U.S.C. 154(b) by 0 days.

(21) Appl. No.: 14/044,941

(22) Filed: Oct. 3, 2013

(65) Prior Publication Data
US 2014/0171583 A1 Jun. 19, 2014

(30) Foreign Application Priority Data
Dec. 14, 2012 (KR) .................. 10-2012-0146546

(51) Int. Cl.
*C08L 69/00* (2006.01)
(52) U.S. Cl.
CPC ...................... *C08L 69/00* (2013.01)
(58) Field of Classification Search
CPC ......... C08L 69/00; C08G 64/64; C08K 5/523
USPC .................... 524/537, 127; 528/202; 525/394
See application file for complete search history.

(56) References Cited

U.S. PATENT DOCUMENTS

| | | | |
|---|---|---|---|
| 6,395,364 B1 | 5/2002 | Davis et al. | |
| 7,317,067 B2 | 1/2008 | Ikeda et al. | |
| 7,671,169 B2 | 3/2010 | Mullen et al. | |
| 7,759,456 B2 | 7/2010 | Brack et al. | |
| 8,470,934 B2 * | 6/2013 | Heuer et al. | 525/394 |
| 8,674,053 B2 | 3/2014 | Isahaya et al. | |
| 8,691,902 B2 * | 4/2014 | Grcev et al. | 524/261 |
| 2006/0036035 A1 | 2/2006 | Govaerts et al. | |
| 2008/0015291 A1 | 1/2008 | Siripurapu et al. | |
| 2010/0159211 A1 | 6/2010 | Blackburn et al. | |
| 2010/0160575 A1 | 6/2010 | Goossens et al. | |
| 2011/0281995 A1 | 11/2011 | Ha et al. | |
| 2012/0052425 A1 | 3/2012 | Jun et al. | |
| 2012/0100474 A1 | 4/2012 | Hikosaka et al. | |
| 2012/0165425 A1 | 6/2012 | Park et al. | |
| 2013/0030094 A1 | 1/2013 | Uchimura et al. | |
| 2014/0171583 A1 | 6/2014 | Hur et al. | |

FOREIGN PATENT DOCUMENTS

| | | |
|---|---|---|
| CN | 102093685 A | 6/2011 |
| CN | 102822233 A | 12/2012 |
| EP | 2199076 A1 | 6/2010 |
| JP | 06-248066 A | 9/1994 |
| JP | 2011-105931 A | 6/2011 |
| KR | 10-1093371 B1 | 6/1999 |
| KR | 10-2003-0022340 A | 3/2003 |
| KR | 10-2004-0102362 A | 12/2004 |
| KR | 10-2009-0026339 A | 3/2009 |
| KR | 10-2012-0031179 A | 3/2012 |
| KR | 10-2012-0073818 A | 7/2012 |
| KR | 10-2012-098773 A | 9/2012 |
| WO | 2014/092243 A1 | 6/2014 |
| WO | 2014/104484 A1 | 7/2014 |

OTHER PUBLICATIONS

Office Action in counterpart Chinese Application No. 2013105461902 dated May 12, 2015, pp. 1-2.
English-translation of Office Action in counterpart Chinese Application No. 2013105461902 dated May 12, 2015, pp. 1-2.
International Search Report in commonly owned International Application No. PCT/KR2013/002697 dated Jun. 26, 2013, pp. 1-4.
International Search Report in commonly owned International Application No. PCT/KR2013/000729 dated Jul. 4, 2013, pp. 1-4.
Office Action in commonly owned Korean Application No. 10-2012-0143947 dated Apr. 13, 2015, pp. 1-6.
Office Action in commonly owned U.S. Appl. No. 14/647,640 mailed Dec. 14, 2015, pp. 1-10.

* cited by examiner

*Primary Examiner* — Tae H Yoon
(74) *Attorney, Agent, or Firm* — Additon, Higgins & Pendleton, P.A.

(57) ABSTRACT

The polycarbonate resin composition includes: a polycarbonate component, which includes an aromatic polycarbonate resin and a copolymerized polycarbonate resin including a repeat unit represented by Formula 1 and a repeat unit represented by Formula 2; and a flame retardant, and has a scratch width of about 310 μm or less as measured by Ball-type Scratch Profile (BSP) test; a pencil hardness rating of F or higher; a flame retardancy level of V-0 or higher as measured on a 2.0 mm thick specimen according to UL94; and a transmittance of about 80% or more as measured in accordance with ASTM D1003. The polycarbonate resin composition can exhibit excellent properties in terms of scratch resistance, flame retardancy and transparency.

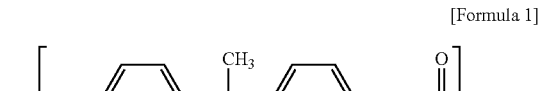

[Formula 1]

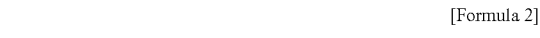

[Formula 2]

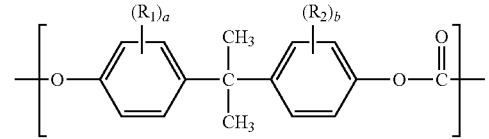

wherein $R_1$ and $R_2$ are the same or different and are each independently substituted or unsubstituted $C_1$ to $C_6$ alkyl, and a and b are the same or different and are each independently an integer from 1 to 4.

12 Claims, No Drawings

POLYCARBONATE RESIN COMPOSITION AND MOLDED ARTICLE PRODUCED THEREFROM

CROSS-REFERENCE TO RELATED APPLICATION

This Application claims priority under 35 USC Section 119 to and the benefit of Korean Patent Application No. 10-2012-0146546, filed Dec. 14, 2012, the entire disclosure of which is incorporated herein by reference.

FIELD OF THE INVENTION

The present invention relates to a polycarbonate resin composition and a molded article produced therefrom.

BACKGROUND OF THE INVENTION

Polycarbonate resins are representative thermoplastic materials having a thermal deformation temperature of about 135° C. or more, and can exhibit excellent mechanical properties such as impact resistance, self extinguishability, dimensional stability, heat resistance and transparency. Thus, polycarbonate resins have been widely used in the manufacture of exterior materials for electric and electronic products, office equipment, and automobile components, and as optical materials for optical disc substrates, various lenses, prisms, optical fibers, and the like.

Polycarbonate resins are frequently used as materials for housings of electronic products and automobiles, which emit considerable heat. Thus, for such applications, flame retardancy is required. For this purpose, flame retardant polycarbonate resin compositions, prepared by adding flame-retardants and the like to polycarbonate resins, have been continuously developed.

However, polycarbonate resins and resin compositions exhibit low scratch resistance, which restricts application thereof to optical films and exterior materials for notebooks, mobile phones, and the like. To supplement scratch resistance of polycarbonate resins, a scratch resistant film may be applied to a polycarbonate film. However, this method has a drawback in that the scratch resistant film is expensive and manufacturing costs can be increased due to an additional coating process.

Therefore, research has been devoted to improving scratch resistance of polycarbonate resins. A widely used method for improving scratch resistance of polycarbonate resins is blending a polycarbonate resin with a resin having scratch resistance such as an acrylic resin.

However, when a polycarbonate resin is blended with an acrylic resin to improve scratch resistance, there can be drastic deterioration in impact resistance and the like. Also, there can be a significant increase in haze due to poor compatibility between the resins to be blended, which can significantly deteriorate transparency of the polycarbonate resin.

Therefore, there is a need for polycarbonate resin compositions exhibiting excellent properties in terms of scratch resistance and flame retardancy without deterioration of inherent properties, such as impact resistance, transparency, and the like.

SUMMARY OF THE INVENTION

The present invention provides a polycarbonate resin composition, which can be superior to existing polycarbonate resin compositions in terms of scratch resistance and flame retardancy with minimal or no deterioration of inherent properties such as impact resistance, transparency, and the like, and which also can be superior to existing flame retardant thermoplastic resin compositions in terms of impact resistance and chemical resistance. The present invention also provides a molded article produced therefrom.

The polycarbonate resin composition includes: a polycarbonate component, which includes an aromatic polycarbonate resin and a copolymerized polycarbonate resin including a repeat unit represented by Formula 1 and a repeat unit represented by Formula 2; and a flame retardant, and has: a scratch width of about 310 μm or less as measured by Ball-type Scratch Profile (BSP) test; a pencil hardness rating of F or higher; a flame retardancy level of V-0 or higher as measured on a 2.0 mm thick specimen according to UL94; and a transmittance of about 80% or more as measured in accordance with ASTM D1003:

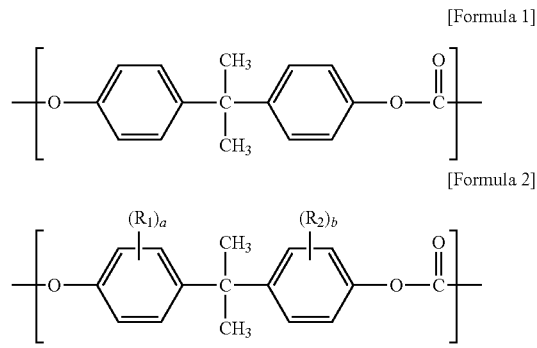

wherein $R_1$ and $R_2$ are the same or different and are each independently substituted or unsubstituted $C_1$ to $C_6$ alkyl and a and b are the same or different and are each independently an integer from 1 to 4.

In one embodiment, the repeat unit represented by Formula 2 may be a repeat unit represented by Formula 2a:

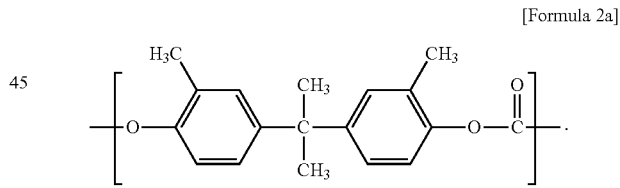

In one embodiment, in the polycarbonate component, the aromatic polycarbonate resin may be present in an amount of about 20% by weight (wt %) to about 80 wt %, and the copolymerized polycarbonate resin may be present in an amount of about 20 wt % to about 80 wt %.

In one embodiment, the flame retardant may be present in an amount of about 5 parts by weight to about 40 parts by weight based on about 100 parts by weight of the polycarbonate component.

In one embodiment, in the copolymerized polycarbonate resin, the repeat unit represented by Formula 1 may be present in an amount of about 5 mol % to about 70 mol %, and the repeat unit represented by Formula 2 may be present in an amount of about 30 mol % to about 95 mol %.

In one embodiment, the copolymerized polycarbonate resin may further include a repeat unit represented by Formula 3:

[Formula 3]

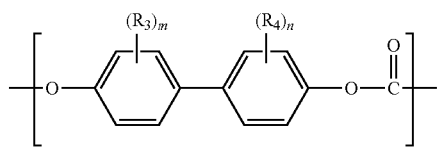

wherein $R_3$ and $R_4$ are the same or different and are each independently substituted or unsubstituted $C_1$ to $C_6$ alkyl and m and n are the same or different and are each independently an integer from 0 to 4.

In one embodiment, the repeat unit represented by Formula 3 may be present in an amount of about 1 part by mole to about 30 parts by mole based on about 100 parts by mole of the repeat unit represented by Formulae 1 and 2.

In one embodiment, the polycarbonate resin composition may have a Vicat softening temperature (VST) of about 100° C. or more, as measured in accordance with ASTM D1525.

The present invention also relates to a molded article produced from the polycarbonate resin composition.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A polycarbonate resin composition according to embodiments of the present invention includes: (A) a polycarbonate component including (A1) an aromatic polycarbonate resin and (A2) a copolymerized polycarbonate resin; and (B) a flame retardant.

(A) Polycarbonate Component (A1) Aromatic Polycarbonate Resin

As the aromatic polycarbonate resin of the present invention, any typical aromatic polycarbonate resin used in preparation of a thermoplastic resin composition in the art may be used without limitation. For example, according to a typical preparation method, the aromatic polycarbonate resin may be prepared by condensation or transesterification of a dihydric phenol compound and a carbonate precursor such as phosgene, diaryl carbonate, and the like, in the presence of a molecular weight regulator and a catalyst.

In such a method for preparing the aromatic polycarbonate resin, the dihydric phenol compound may be a bisphenol compound, for example 2,2-bis(4-hydroxyphenyl)propane ("bisphenol A"). In this case, bisphenol A may be partially or wholly replaced by another type of dihydric phenol compound. Available examples of the other type of dihydric phenol compound may include without limitation hydroquinone, 4,4'-dihydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, bis(4-hydroxyphenyl)ether, halogenated bisphenols such as 2,2-bis(3,5-dibromo-4-hydroxyphenyl)propane, and the like, and combinations thereof.

However, it should be understood that applicable dihydric phenol compounds for preparing the aromatic polycarbonate resin are not limited thereto, and the aromatic polycarbonate resin may be prepared using any dihydric phenol compound.

In addition, the aromatic polycarbonate resin may be a single polymer using one type of dihydric phenol compound, a copolymer using at least two types of dihydric phenol compound, or a mixture thereof. However, in the case of the copolymer, the aromatic polycarbonate resin is different from the copolymerized polycarbonate resin (A2).

Generally, the aromatic polycarbonate resin may have any form of linear polycarbonate, branched polycarbonate, polyester carbonate copolymer resins, and the like, and combinations thereof. As the aromatic polycarbonate resin included in the polycarbonate resin composition according to the invention, any of these linear polycarbonate resins, branched polycarbonate resins, polyestercarbonate copolymer resins, and the like, and combinations thereof, may be used without limitation to a specific form.

For example, the linear polycarbonate resin may be a bisphenol A-based polycarbonate resin, and the branched polycarbonate resin may be a resin prepared by reacting a multifunctional aromatic compound, such as trimellitic anhydride, trimellitic acid, and the like, with a dihydric phenol compound and a carbonate precursor. In addition, for example, the polyester carbonate copolymer resin may employ a resin prepared by reacting a bifunctional carboxylic acid with a dihydric phenol compound and a carbonate precursor. In addition to these, any typical linear polycarbonate, branched polycarbonate, and/or polyester carbonate copolymer resins may be used without limitation.

The polycarbonate component (A) may include the aromatic polycarbonate resin (A1) in an amount of about 20 wt % to about 80 wt %, for example about 30 wt % to about 70 wt %, based on the total weight (100 wt %) of the polycarbonate component (A). In some embodiments, the polycarbonate component (A) may include the aromatic polycarbonate resin (A1) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the aromatic polycarbonate resin (A1) can be in a range from about any of the foregoing amounts to about any other of the foregoing amounts.

Within this range, the polycarbonate resin composition can exhibit excellent impact resistance, and can be prepared economically.

The aromatic polycarbonate resin may have a weight average molecular weight (Mw) from about 18,000 g/mol to about 33,000 g/mol, for example from about 22,000 g/mol to about 30,000 g/mol, as measured by Gel Permeation Chromatography (GPC). Within this range, the polycarbonate resin composition can exhibit excellent mechanical properties.

(A2) Copolymerized Polycarbonate Resin

The copolymerized polycarbonate resin of the present invention may improve properties of the polycarbonate resin composition, such as scratch resistance, and the like, with minimal or no deterioration of inherent properties, such as transparency, heat resistance, impact resistance, and the like, and includes a repeat unit represented by Formula 1 and a repeat unit represented by Formula 2.

[Formula 1]

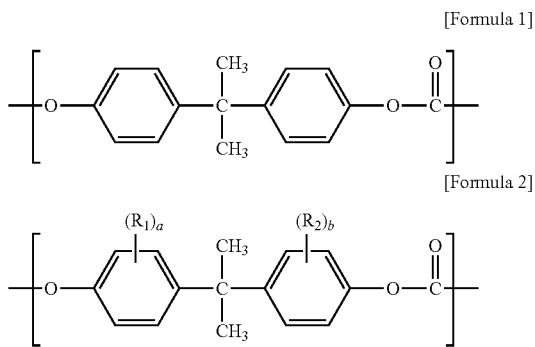

[Formula 2]

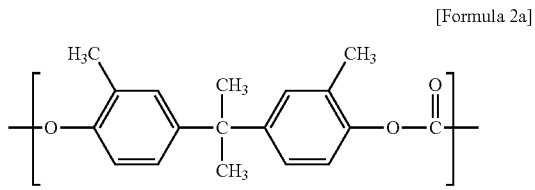

In Formula 2, $R_1$ and $R_2$ are the same or different and are each independently substituted or unsubstituted $C_1$ to $C_6$ alkyl, and a and b are the same or different and are each independently an integer from 1 to 4.

As used herein, the term "substituted" means that a hydrogen atom is substituted with halogen, $C_1$ to $C_{10}$ alkyl, $C_1$ to $C_{10}$ haloalkyl, $C_6$ to $C_{10}$ aryl, $C_1$ to $C_{10}$ alkoxy, or a combination thereof.

One example of the repeat unit represented by Formula 2 may be a repeat unit represented by Formula 2a, without being limited thereto.

[Formula 2a]

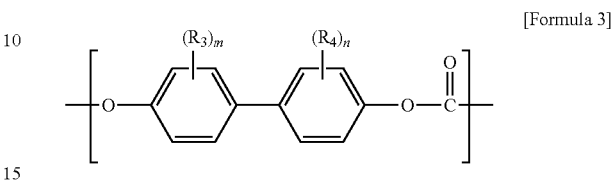

In one embodiment, the copolymerized polycarbonate resin may include the repeat unit represented by Formula 1 in an amount of about 5 mol % to about 70 mol %, for example about 10 mol % to about 50 mol %, and the repeat unit represented by Formula 2 in an amount of about 30 mol % to about 95 mol %, for example about 50 mol % to about 90 mol %, wherein the mol % of each is based on the total mol % (100 mol %) of the repeat unit represented by Formula 1 and the repeat unit represented by Formula 2.

In some embodiments, the copolymerized polycarbonate resin may include the repeat unit represented by Formula 1 in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 mol %. Further, according to some embodiments of the present invention, the amount of the repeat unit represented by Formula 1 can be in a range from about any of the foregoing amounts to about any other of the foregoing amounts.

In some embodiments, the copolymerized polycarbonate resin may include the repeat unit represented by Formula 2 in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 mol %. Further, according to some embodiments of the present invention, the amount of the repeat unit represented by Formula 2 can be in a range from about any of the foregoing amounts to about any other of the foregoing amounts.

When the copolymerized polycarbonate resin includes the repeat unit represented by Formula 1 and Formula 2 in amounts within the above ranges, the polycarbonate resin composition can exhibit excellent scratch resistance.

The copolymerized polycarbonate resin may be a terpolymer further including a repeat unit represented by Formula 3.

[Formula 3]

In Formula 3, $R_3$ and $R_4$ are the same or different and are each independently substituted or unsubstituted $C_1$ to $C_6$ alkyl, and m and n are the same or different and are each independently an integer from 0 to 4.

The copolymerized polycarbonate resin may include the repeat unit represented by Formula 3 in an amount of about 1 part by mole to about 30 parts by mole, for example about 5 parts by mole to about 15 parts by mole, based on about 100 parts by mole of the repeat units represented by Formulae 1 and 2. In some embodiments, the copolymerized polycarbonate resin may include the repeat unit represented by Formula 3 in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by mol. Further, according to some embodiments of the present invention, the amount of the repeat unit represented by Formula 3 can be in a range from about any of the foregoing amounts to about any other of the foregoing amounts.

When the copolymerized polycarbonate resin includes the repeat unit represented by Formula 3 in an amount within this range, the polycarbonate resin composition can exhibit more excellent chemical resistance.

The polycarbonate component (A) may include the copolymerized polycarbonate resin (A2) in an amount of about 20 wt % to about 80 wt %, for example about 30 wt % to about 70 wt %, based on the total weight (100 wt %) of the polycarbonate component (A). In some embodiments, the polycarbonate component (A) may include the copolymerized polycarbonate resin (A2) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the copolymerized polycarbonate resin (A2) can be in a range from about any of the foregoing amounts to about any other of the foregoing amounts.

Within this range, the polycarbonate resin composition can exhibit excellent properties in terms of scratch resistance, chemical resistance, and the like, and can be prepared economically.

The copolymerized polycarbonate resin may have a weight average molecular weight (Mw) from about 18,000 g/mol to about 33,000 g/mol, for example from about 22,000 g/mol to about 30,000 g/mol, as measured by Gel Permeation Chromatography (GPC). Within this range, the polycarbonate resin composition can exhibit excellent mechanical properties.

The copolymerized polycarbonate resin may be prepared by any typical method for preparation of polycarbonate resin. For example, the copolymerized polycarbonate resin may be prepared by condensation or transesterification of a diol mixture, which includes a diol compound (bisphenol A (BPA)) represented by Formula 4 and a diol compound represented by Formula 5, and a carbonate precursor.

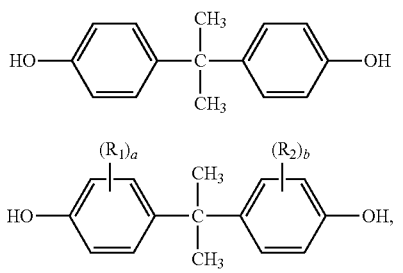

[Formula 4]

[Formula 5]

wherein, $R_1$, $R_2$, a and b are the same as defined in Formula 2.

One example of the diol compound represented by Formula 5 may be 3,3'-dimethyl bisphenol A (DMBPA), without being limited thereto.

In the diol mixture, the diol compound represented by Formula 4 may be present in an amount of about 5 mol % to about 70 mol %, for example about 10 mol % to about 50 mol %, and the diol compound represented by Formula 5 may be present in an amount of about 30 mol % to about 95 mol %, for example about 50 mol % to about 90 mol %, wherein the mol % of each is based on the total mol % (100 mol %) of the diol compound represented by Formula 4 and the diol compound represented by Formula 5. Within this range, the polycarbonate resin composition can exhibit excellent scratch resistance.

In one embodiment, the diol mixture may be prepared as a terpolymer by further including a biphenol compound represented by Formula 6.

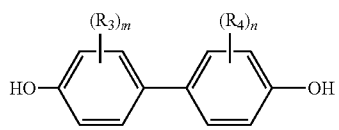

[Formula 6]

wherein $R_3$, $R_4$, m and n are the same as defined in Formula 3.

Examples of the biphenol compound represented by Formula 6 may include without limitation 4,4'-biphenol, 2,2'-dimethyl 4,4'-biphenyldiol, 3,3-dimethyl 4,4-dihydroxy biphenyl, 2,2',6,6'-tetramethyl-4,4'-biphenol, and the like, and combinations thereof. In exemplary embodiments, the biphenol compound represented by Formula 6 may be 4,4'-biphenol.

The biphenol compound represented by Formula 6 may be present in an amount of about 1 part by mole to about 30 parts by mole, for example about 5 parts by mole to about 15 parts by mole, based on about 100 parts by mole of the diol compounds represented by Formulae 4 and 5. Within this range, the polycarbonate resin composition can exhibit more excellent chemical resistance.

Examples of the carbonate precursor may include without limitation phosgene, triphosgene, diaryl carbonate, mixtures thereof, and the like. In addition, examples of the diaryl carbonate may include without limitation diphenyl carbonate, ditolyl carbonate, bis(chlorophenyl)carbonate, m-cresyl carbonate, dinaphthylcarbonate, bis(diphenyl)carbonate, diethyl carbonate, dimethyl carbonate, dibutyl carbonate, dicyclohexyl carbonate, and the like. These can be used alone or in combination thereof. In exemplary embodiments, diphenyl carbonate is used as the diaryl carbonate.

For example, a molar ratio (diol mixture/carbonate precursor) of the diol mixture to the carbonate precursor may range from about 0.6 to about 1.0, for example from about 0.7 to about 0.9. Within this range, the polycarbonate resin composition can exhibit excellent mechanical strength.

In one embodiment, the reaction between the diol mixture and the carbonate precursor may be transesterification, which may be performed at a temperature from about 150° C. to about 300° C., for example from about 160° C. to about 280° C., and as another example from about 190° C. to about 260° C., under reduced pressure. Within this temperature range, the reaction can be advantageous with regard to reaction rate and decreased side reactions.

Further, transesterification can be performed under a reduced pressure of about 100 torr or less, for example, about 75 torr or less, as another example about 30 torr or less, as another example about 1 torr or less for about 10 minutes or more, as another example about 15 minutes to about 24 hours and as another example about 15 minutes to about 12 hours, which can be advantageous with regard to reaction rate and decreased side reactions.

The transesterification may be performed in the presence of a catalyst. As the catalyst, any typical catalyst used in transesterification may be used. Examples of the catalyst may include without limitation alkali metal catalysts, alkaline earth metal catalysts, and the like, and combinations thereof. Examples of the alkali metal catalysts may include without limitation LiOH, NaOH, KOH, and the like. These may be used alone or in combination thereof.

The catalyst may be present in an amount of about $1\times10^{-8}$ mole to about $1\times10^{-3}$ mole, for example about $1\times10^{-7}$ mole to about $1\times10^{-4}$ mole, per mole of the diol mixture. Within this range, the resin can exhibit sufficient reactivity and production of side products because side reactions can be minimized, which can help improve thermal stability and color stability.

(B) Flame Retardant

In embodiments of the present invention, any typical flame retardant used in preparation of a thermoplastic resin composition in the art may be used as the flame retardant. Examples of the flame retardant may include without limitation: phosphorus flame retardants such as phosphoric acid, phosphate ester compounds, polyphosphate compounds, red phosphorus compounds, and the like; halogen flame retardants; and mixtures thereof. In exemplary embodiments, the flame retardant is a phosphorous flame retardant which is environmentally friendly, for example a phosphate ester compound. Examples of the phosphate ester compound may include without limitation bisphenol A diphosphate, diphenylphosphate, triphenylphosphate, tricresylphosphate, trixylenylphosphate, tri(2,6-dimethylphenyl)phosphate, tri(2,4,6-trimethylphenyl)phosphate, tri(2,4-di-tert-butylphenyl) phosphate, tri(2,6-dimethylphenyl)phosphate, resorcinol bis (diphenyl)phosphate, resorcinol bis(2,6-dimethylphenyl) phosphate, resorcinol bis(2,4-di-tert-butylphenyl)phosphate, hydroquinol bis(2,6-dimethylphenyl)phosphate, hydroquinol bis(2,4-di-tert-butylphenyl)phosphate, and the like. These phosphate ester compounds may be used alone or in combination thereof.

The polycarbonate resin composition may include the flame retardant in an amount of about 5 parts by weight to about 40 parts by weight, for example about 10 parts by weight to about 20 parts by weight, based on about 100 parts by weight of the polycarbonate component. In some embodiments, the polycarbonate resin composition may include the flame retardant in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight.

Further, according to some embodiments of the present invention, the amount of the flame retardant can be in a range from about any of the foregoing amounts to about any other of the foregoing amounts.

Within this range, the polycarbonate resin composition can exhibit excellent flame retardancy without deterioration of other inherent properties.

In some embodiments, the polycarbonate resin composition may further include one or more additives. Examples of the additives include without limitation flame retardation aids, lubricants, surfactants, nucleating agents, coupling agents, fillers, plasticizers, antibacterial agents, release agents, heat stabilizers, antioxidants, photostabilizers, compatibilizers, inorganic additives, antistatic agents, pigments, dyes, and the like, as necessary. These additives may be used alone or in combination thereof. These additives may be included in the total polycarbonate resin composition by being added thereto during typical pelletization (extrusion), although methods for adding these additives thereto are not particularly limited. The additives may be present in an amount of about 0.001 parts by weight to about 20 parts by weight based on about 100 parts by weight of the polycarbonate component, without being limited thereto.

According to the embodiments of the invention, the polycarbonate resin composition can be superior to existing polycarbonate resin compositions, which include only an acrylic resin component instead of the polycarbonate component or employ only a copolymerized polycarbonate resin as the polycarbonate component, in terms of scratch resistance, flame retardancy and/or impact resistance due to the polycarbonate component and the flame retardant included therein. In exemplary embodiments, the polycarbonate resin composition can have: a scratch width of about 310 µm or less, for example from about 100 µm to about 290 µm, as measured by Ball-type Scratch Profile (BSP) test; a pencil hardness rating of F or higher, for example from H to 3H, as measured under a load of 500 g in accordance with ASTM D3362; a flame retardancy level of V-0 or higher, as measured on a 2.0 mm thick specimen according to UL94 VB flame retardancy regulations; and a transmittance of about 80% or more, for example, from about 80% to about 95%, for example from about 85% to about 95%, as measured on a 2.0 mm thick specimen in accordance with ASTM D1003. Within this range, the polycarbonate resin composition can be used alone as an exterior material for electronic products without a protective film or coating.

In addition, the polycarbonate resin composition may have a Vicat softening temperature (VST) of about 100° C. or more, for example from about 100° C. to 130° C., as measured in accordance with ASTM D1525. Within this range, the polycarbonate resin composition can be used in the manufacture of automobile components, and the like.

The present invention also relates to a molded article produced from the polycarbonate resin composition.

According to embodiments of the invention, the polycarbonate resin composition may be prepared in pellet form by melt extrusion in an extruder after mixing the above components and other additives at the same time, and the prepared pellets may be prepared as various molded articles (products) through various molding methods such as injection molding, extrusion, vacuum molding, cast molding, and the like. These molding methods are well known to those skilled in the art. The molded articles can exhibit excellent properties in terms of heat resistance, scratch resistance, flame retardancy, transparency, and the like, and thus can be widely applied to optical films, components of electric and electronic products, exterior materials, automobile components, miscellaneous goods, structural materials, and the like.

Next, the present invention will be explained in more detail with reference to some examples. It should be understood that these examples are provided for illustration only and are not to be in any way construed as limiting the present invention.

EXAMPLES

Details of components used in the following examples and comparative examples are as follows:

(A) Aromatic Polycarbonate Resin

Polycarbonate resin (L-1250WP, TEIJIN Co., Ltd.).

(B) Copolymerized Polycarbonate Resin (B-1) A copolymerized polycarbonate resin (weight average molecular weight: 28,000 g/mol) prepared by condensation polymerization of a diol mixture, which includes 10 mol % of 2,2-bis(4-hydroxyphenyl)propane (BPA) and 90 mol % of 3,3'-dimethylbisphenol A (DMBPA), and a diphenylcarbonate in a molar ratio of 0.9:1.0.

(B-2) A copolymerized polycarbonate resin (weight average molecular weight: 28,000 g/mol) prepared by condensation polymerization of a diol mixture, which includes 5 mol % of 2,2-bis(4-hydroxyphenyl)propane (BPA), 90 mol % of 3,3'-dimethylbisphenol A (DMBPA) and 5 mol % of 4,4-biphenol (BP), and a diphenylcarbonate in a molar ratio of 0.9:1.0.

(B-3) A copolymerized polycarbonate resin (weight average molecular weight: 28,000 g/mol) prepared by condensation polymerization of a diol mixture, which includes 45 mol % of 2,2-bis(4-hydroxyphenyl)propane (BPA), 50 mol % of 3,3'-dimethylbisphenol A (DMBPA) and 5 mol % of 4,4-biphenol (BP), and a diphenylcarbonate in a molar ratio of 0.9:1.0.

(C) Flame Retardant

Bisphenol A diphosphate (CR-741, Daihachi Chemical Industry Co., Ltd.).

(D) As a Methacrylic Resin, a Polymethylmethacrylate (PMMA) Resin (L84, LG MMA) is Used.

Examples 1 to 8 and Comparative Examples 1 to 2

The components are mixed in amounts as listed in Table 1, followed by melting, kneading and extrusion to prepare pellets. A twin-screw extruder having a diameter of 45 mm and L/D=29 is used for extrusion. The prepared pellets are dried at 80° C. for 6 hours and injection-molded in a 6 Oz injection machine to prepare specimens. Properties of the prepared specimens are evaluated by the following methods, and results are shown in Table 1.

TABLE 1

| | | | Example | | | | | | | | Comparative Example | |
|---|---|---|---|---|---|---|---|---|---|---|---|---|
| | | | 1 | 2 | 3 | 4 | 5 | 6 | 7 | 8 | 1 | 2 |
| (A) (wt %) | | | 50 | 30 | 70 | 50 | 50 | 30 | 70 | 50 | 60 | 70 |
| (B) (wt %) | (B-1) | | 50 | 70 | 30 | — | — | — | — | — | — | — |
| | (B-2) | | — | — | — | 50 | 50 | 70 | 30 | — | — | — |
| | (B-3) | | — | — | — | — | — | — | — | 50 | — | — |
| (D) (wt %) | | | — | — | — | — | — | — | — | — | 40 | 30 |

TABLE 1-continued

|  | Example | | | | | | | | Comparative Example | |
| --- | --- | --- | --- | --- | --- | --- | --- | --- | --- | --- |
|  | 1 | 2 | 3 | 4 | 5 | 6 | 7 | 8 | 1 | 2 |
| (C) (parts by weight) | 15 | 15 | 15 | 25 | 15 | 15 | 15 | 15 | 25 | 15 |
| Transmittance (%) | 87.4 | 87.5 | 87.8 | 86.9 | 87.4 | 87.5 | 87.8 | 87.5 | 5.1 | 9.9 |
| Flame retardancy | V0 | V0 | V0 | V0 | V0 | V0 | V0 | V0 | V2 | V2 |
| Heat resistance (° C.) | 112.2 | 107.4 | 118.6 | 102.5 | 112.2 | 107.4 | 118.6 | 119.5 | 88.0 | 94.9 |
| BSP (width, μm) | 260 | 226 | 270 | 259 | 260 | 228 | 270 | 269 | 270 | 295 |
| Pencil hardness | H | 2H | F | H | H | 2H | F | F | F | HB |

Evaluation of Properties (1) Transparency: To evaluate transparency, transmittance (%) is measured on a 2.0 mm thick specimen using a Hazer meter NDH 2000 (Nippon Denshoku Co., Ltd.) in accordance with ASTM D1003. Transmittance (total light transmittance (total transmitted light (TT)), %) is calculated from the total amount of diffuse transmitted light (DF) and parallel transmitted light (PT).

(2) Flame retardancy: Flame retardancy is measured on a 2.0 mm thick specimen according to UL94 VB flame retardancy regulations.

(3) Heat resistance (VST, unit: ° C.): Vicat softening temperature (VST) is measured under a load of 5 kgf in accordance with ASTM D1525.

(4) Ball-type Scratch Profile (BSP): A 10 mm to 20 mm long scratch is applied to a surface of a specimen having a size of L90 mm×W50 mm×t2.5 mm under a load of 1,000 g at a scratch speed of 75 mm/min using a spherical metal tip having a diameter of 0.7 mm. A scratch width (unit: μm), which is an indicator of scratch resistance, is measured by surface scanning of a profile of the applied scratch with a metal stylus tip having a diameter of 2 μm using a contact type surface profile analyzer XP-1 (Ambios Co., Ltd.). Scratch resistance increases with decreasing scratch width.

(5) Pencil hardness: Pencil hardness is measured under a load of 500 g in accordance with ADTM D3362.

From the results shown in Table 1, it can be seen that the polycarbonate resin compositions according to embodiments of the invention (Examples 1 to 8) exhibit excellent properties in terms of heat resistance, scratch resistance, flame retardancy, transparency, and the like, while providing good balance therebetween. In contrast, it can be seen that the polycarbonate resin compositions according to Comparative Examples 1 and 2, which employ an acrylic resin instead of the copolymerized polycarbonate resin according to the inventive examples, exhibit deteriorated properties in terms of heat resistance, flame retardancy, transparency, and the like, and provide a poor balance therebetween.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate resin composition comprising:
   a polycarbonate component, which comprises an aromatic polycarbonate resin and a copolymerized polycarbonate resin comprising a repeat unit represented by Formula 1 and a repeat unit represented by Formula 2; and
   a flame retardant,
   wherein the polycarbonate component comprises the aromatic polycarbonate resin in an amount of about 30 wt % to about 70 wt % and the copolymerized polycarbonate resin in an amount of about 30 wt % to about 70 wt %,
   wherein, in the copolymerized polycarbonate resin, the repeat unit represented by Formula 1 is present in an amount of about 5 mol % to about 70 mol % and the repeat unit represented by Formula 2 is present in an amount of about 30 mol % to about 95 mol %, and
   the polycarbonate resin composition having: a scratch width of 290 μm or less as measured by Ball Scratch Profile (BSP) test; a pencil hardness rating of F or higher; a flame retardancy level of V-0 or higher as measured on a 2.0 mm thick specimen according to UL94; a Vicat softening temperature (VST) of 102.5° C. or more, as measured in accordance with ASTM D1525; and a transmittance of about 85% or more as measured in accordance with ASTM D1003,

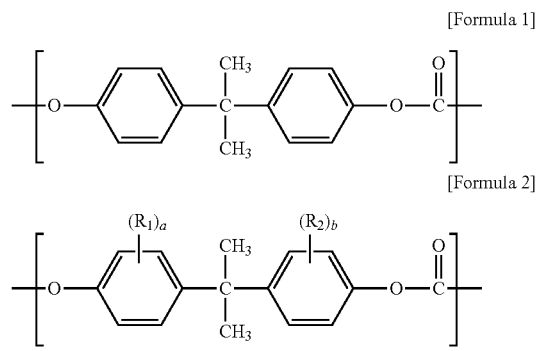

[Formula 1]

[Formula 2]

wherein $R_1$ and $R_2$ are the same or different and each independently substituted or unsubstituted $C_1$ to $C_6$ alkyl, and a and b are the same or different and each independently an integer from 1 to 4.

2. The polycarbonate resin composition according to claim 1, wherein the repeat unit represented by Formula 2 is a repeat unit represented by Formula 2a:

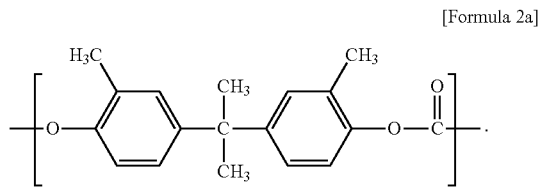

[Formula 2a]

3. The polycarbonate resin composition according to claim 1, comprising the flame retardant in an amount of about 5 parts by weight to about 40 parts by weight based on about 100 parts by weight of the polycarbonate component.

4. The polycarbonate resin composition according to claim 1, wherein the copolymerized polycarbonate resin further comprises a repeat unit represented by Formula 3:

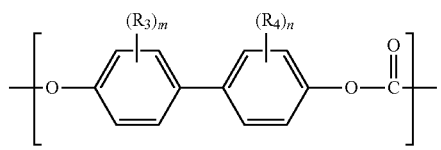

[Formula 3]

wherein $R_3$ and $R_4$ are the same or different and are each independently substituted or unsubstituted $C_1$ to $C_6$ alkyl, and m and n are the same or different and are each independently an integer from 0 to 4.

5. The polycarbonate resin composition according to claim 4, wherein the repeat unit represented by Formula 3 is present in an amount of about 1 part by mole to about 30 parts by mole based on about 100 parts by mole of the repeat units represented by Formulae 1 and 2.

6. A molded article produced from the polycarbonate resin composition according to claim 1.

7. The polycarbonate resin composition according to claim 1, wherein the polycarbonate resin composition has a Vicat softening temperature (VST) of about 102.5° C. to about 130° C. as measured in accordance with ASTM D1525.

8. The polycarbonate resin composition according to claim 7, wherein the polycarbonate resin composition has a transmittance of about 85% to about 95% as measured in accordance with ASTM D1003.

9. The polycarbonate resin composition according to claim 1, wherein the aromatic polycarbonate is prepared by condensation or transesterification of a dihydric phenol compound and a carbonate precursor, wherein the dihydric phenol compound is selected from the group consisting of 2,2-bis(4-hydroxyphenyl)propane, hydroquinone, 4,4'-dihydroxydiphenyl, bis(4-hydroxyphenyl)methane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, bis(4-hydroxyphenyl)ether, 2,2-bis(3,5-dibromo-4-hydroxyphenyl)propane, and combinations thereof.

10. The polycarbonate resin composition according to claim 1, wherein, in the copolymerized polycarbonate resin, the repeat unit represented by Formula 1 is present in an amount of about 5 mol % to about 45 mol %, and wherein the polycarbonate resin composition has a scratch width of 270 μm or less as measured by Ball Scratch Profile (BSP) test.

11. The polycarbonate resin composition according to claim 10, wherein the polycarbonate resin composition has a pencil hardness rating from H to 3H.

12. The polycarbonate resin composition according to claim 10, wherein, in the copolymerized polycarbonate resin, the repeat unit represented by Formula 2 is present in an amount of about 50 mol % to about 95 mol %, and wherein the copolymerized polycarbonate resin further optionally comprises a repeat unit represented by Formula 3:

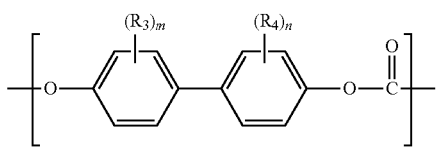

[Formula 3]

wherein $R_3$ and $R_4$ are the same or different and are each independently substituted or unsubstituted $C_1$ to $C_6$ alkyl, and m and n are the same or different and are each independently an integer from 0 to 4, in an amount of 0 to about 30 parts by mole based on about 100 parts by mole of the repeat units represented by Formulae 1 and 2.

* * * * *